March 8, 1966   O. R. CLARK   3,239,698
THERMAL PROTECTION FOR FOOD WASTE DISPOSER
Filed July 26, 1963
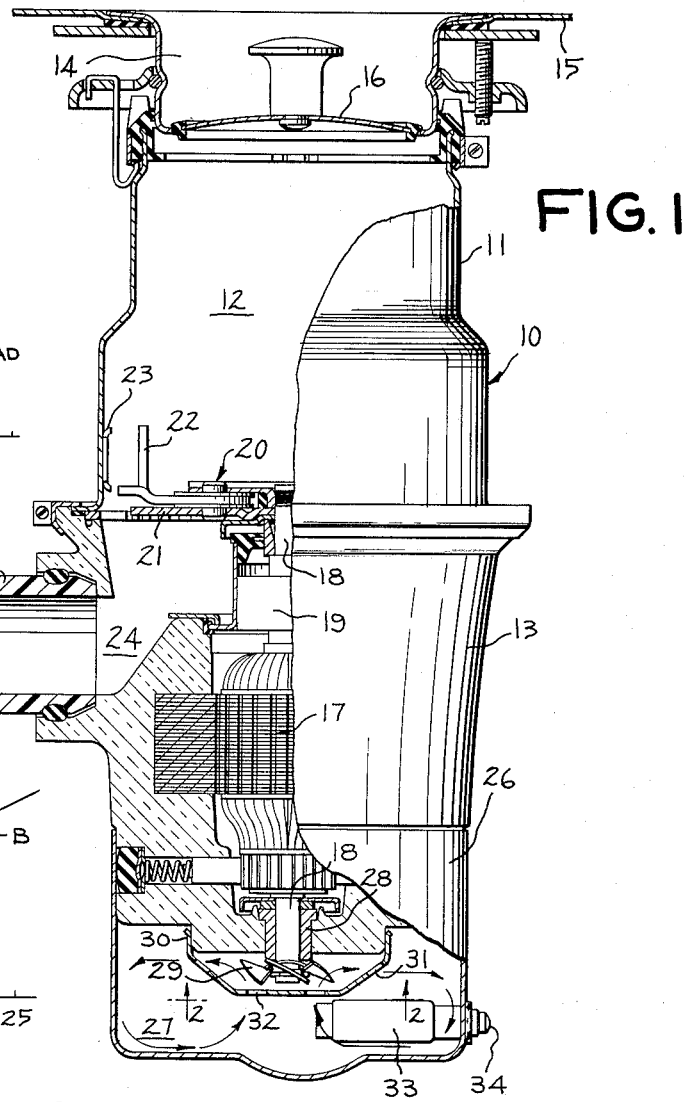
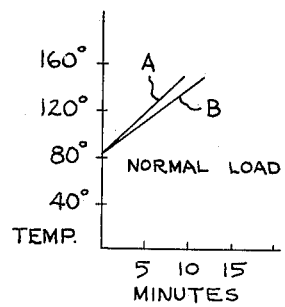
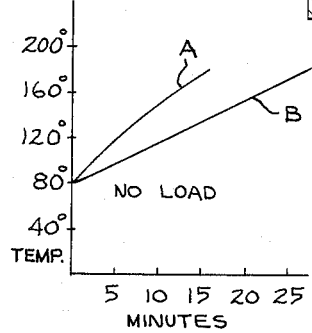
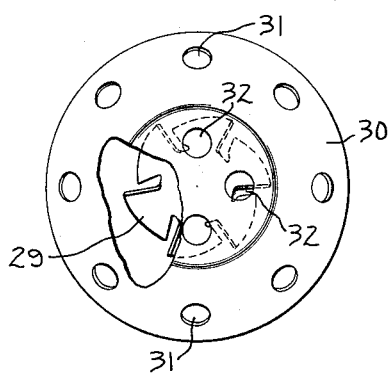
INVENTOR.
OLIVER R. CLARK
BY *Sheridan Le Begg*
HIS ATTORNEY

United States Patent Office 3,239,698
Patented Mar. 8, 1966

3,239,698
THERMAL PROTECTION FOR FOOD WASTE
DISPOSER
Oliver R. Clark, Louisville, Ky., assignor to General Electric Company, a corporation of New York
Filed July 26, 1963, Ser. No. 297,811
6 Claims. (Cl. 310—57)

This invention relates to electric motors and, more specifically, to an encapsulated series-wound motor for use with a food waste disposer.

In the past, food waste disposers were generally powered by single phase induction motors. More recently, however, high speed series-wound motors have received favorable reception primarily as a result of cost advantage over the single phase induction motor. The present invention is concerned with the use of a series-wound motor which may be termed a potted or encapsulated motor wherein the stator is cast into a non-magnetic material such as a suitable formulation of epoxy resin. Such a motor is a totally enclosed motor so that moisture and other deleterious elements may not enter to do harm to the motor assembly. Since the motor housing is essentially air tight, cooling of the motor by the conventional means of drawing air through the motor is impossible. Therefore, thermal protection of an encapsulated motor is especially critical. However, as a further concomitant of encapsulation, it has been difficult, with means heretofore known, to properly transmit the heat from the various components of the motor to a thermally responsive control means. It would be possible to overcome this heat transmission problem by positioning a separate thermally responsive control means at each thermally critical location of the motor but this obviously would be expensive. Moreover, since the speed of a series-wound motor varies with the load applied thereto, as opposed to an induction motor wherein the speed remains essentially constant despite load conditions, it is desirable to have an arrangement which will de-energize the motor within an acceptable time when the motor is operated at no load, and at the resulting high speed, even though heat generation within the motor may not be as great as during normal load operation.

Accordingly, it is an object of the present invention to provide an improved thermal protective system for an encapsulated motor.

It is another object of this invention to provide a thermal protective system for an encapsulated motor which is effectively responsive to the accumulative temperatures of the motor shaft, shaft bearing and the encapsulating casting while still necessitating only a single thermally responsive switch.

It is another object of this invention to provide a thermal protective system for an encapsulated series-wound motor, employed in a food waste disposer, which will significantly limit the time of no load high-speed operation of the food waste disposer but will not significantly affect the time of normal load operation.

Briefly stated, in accordance with one aspect of the invention, there is provided a food waste disposer having a comminuting means and an encapsulated electric motor to drive the comminuting means. Circulating means are mounted on one end of the motor shaft and are disposed within a heat transfer chamber which also contains a thermally responsive means to de-energize the motor when it senses a temperature in excess of a predetermined value. The circulating means circulates a heat transfer medium into heat exchange relationship with the motor casing, motor shaft, shaft bearing and the thermally responsive means to thereby make the thermally responsive means more sensitive to these critical components of the motor.

While the specification concludes with claims particularly pointing out and distinctly claiming the subject matter which is regarded as the invention, it is believed the invention will be better understood from the following description taken in connection with the accompanying drawings, in which:

FIGURE 1 is an elevational view, partially cut away to show details, of a food waste disposer embodying the present invention;

FIGURE 2 is a view taken along line 2—2 of FIGURE 1;

FIGURE 3 is a graph comparing operating characteristics, under no load, of a food waste disposer embodying the present invention with a food waste disposer identical in construction but not having the present invention; and FIGURE 4 is a graph representing a comparison similar to FIGURE 3 but with the food waste disposer operating under normal load.

Referring now to the drawings, and particularly to FIGURE 1, there is illustrated a food waste disposer 10 in which the present invention may be used. The disposer 10 includes a generally cylindrical hopper 11 having a comminuting chamber 12 therein and secured at its lower end to a casing 13. The upper end of the hopper 11 is designed to be suspended from the drain opening or sink flange 14 of a typical kitchen sink 15. Any suitable suspension means may be employed for this purpose and such means is disclosed and claimed by Johnny W. Yartz and Francis J. Clements in U.S. Patent No. 3,108,755, which issued October 29, 1963, and is assigned to the General Electric Company, assignee of the present invention. Since this particular suspension means does not form a material part of the present invention, it is not discussed in detail herein. A simple stopper 16 is positioned within the sink flange 14 to serve as a stopper or plug for the sink 15 when it is desired to fill the sink with water. The stopper 16 is easily removable for the loading of food waste into the hopper 11 and for passage of water into the hopper 11 continuously during the comminuting operation.

An electric motor 17 is encapsulated within casing 13 and is provided with an upwardly extending shaft 18 which is supported by bearing 19. Shaft 18 is connected to a comminuting means shown generally at 20. The comminuting means 20 includes a flywheel 21 having at least one impeller 22 pivotally secured thereto. Cooperating with the impeller 22 to provide a comminuting action is a grinding pad 23 secured to the inner wall of hopper 11.

The construction thus far described does not form a material part of the present invention and, as will become more evident as the description proceeds, many of the aforementioned elements may be materially modified from the specific illustration shown in the drawing.

The operation of the device as thus far described is as follows. Stopper 16 is removed and food waste is inserted into hopper 11 by the operator. As is customary in food waste disposers of the type shown in FIGURE 1, it is desirable to have the kitchen faucet running to provide a constant supply of water into hopper 11 during the comminuting process. A switch (not shown) is closed to energize the electric motor 17 whereupon shaft 18 rotates, and with it, the comminuting means 20. The food waste in hopper 11 is comminuted by the interaction between the impeller 22 and the grinding pad 23. As the food waste is ground up, the water entering hopper 11 carries the ground up food waste into a sump 24 below the comminuting means 20. The food waste is carried from the sump 24 to the normal household sewer system by means of a discharge 25.

As mentioned earlier, the present invention is primarily concerned with a food waste disposer having an encapsulated series-wound motor. Encapsulated motors are used to advantage in food waste disposers since encapsulation precludes the admission of moisture and other deleterious elements into the motor assembly. However, encapsulation makes it difficult and impractical to ventilate the motor for cooling purposes since the encapsulation provides a substantially air-tight structure encompassing the motor stator. Accordingly, the present invention contemplates a structure which will facilitate cooling of certain critical motor elements, though not as effectively as flowthrough ventilation, and at the same time provide a thermal protective system which is effectively responsive to the accumulative temperature of these critical elements to de-energize the motor when the accumulative temperature exceeds a predetermined value.

To achieve these objects, a housing 26 overlaps, and is secured to, the lower end of casing 13 and defines an enclosed heat transfer chamber 27 adjacent the lower end of casing 13. The lower end of shaft 18 extends through the casing 13 and is supported by a bearing 28. Circulating means, in the form of a fan or blower 29, is secured to the lower extremity of the shaft 18 to rotate therewith at a speed directly proportional to the speed of the motor 17 and the comminuting means 20.

Disposed about the fan 29, and secured to the lower end of casing 13, is a generally cup-shaped flow directing means 30. The flow directing means 30 is provided with a plurality of outlet openings 31 radially spaced about its outer periphery, and a plurality of inlet openings 32 radially spaced about its center. The flow directing means 30 direct the flow of the medium within chamber 27 into heat exchange relationship with bearing 28, shaft 18 and casing 13 whereupon the medium absorbs heat as shown by the arrows in FIGURE 1. The flow directing means 30 further directs the medium into heat exchange relationship with the inner surface of housing 26, which is preferably formed of a material having a high heat conductivity. Due to the relatively large surface area of housing 26, a significant amount of heat is transferred from chamber 27 through the wall of housing 26.

A thermally responsive means 33 is disposed within chamber 27 such that the circulating medium is constantly brought into heat exchange relationship therewith. Due to the general turbulence of the medium caused by the fan 29, the temperature of the medium subsantially represents the accumulative temperatures of bearing 28, shaft 18 and the lower end of casing 13. The thermally responsive means 33 is in electrical communication with the motor 17 such that it will de-energize motor 17 when it senses a temperature in excess of some predetermined value. A manually operable button 34 is provided in the thermally responsive means 33 to allow for manual resetting of the thermally responsive means 33 after it has de-energized motor 17.

Any suitable heat transfer medium may be contained within chamber 27. It has been found in practice that with the structure shown and described herein, ordinary air at essentially atmospheric pressure performs suitably.

At this point, it should be obvious that the present invention is particularly adapted for use in a totally-enclosed structure. That is, the housing 26 need not have openings therein to provide ventilation. However, the invention is not necessarily limited to such an arrangement. A structure comprising a housing similar to housing 26 but having one or more openings therethrough would still fall within the spirit and scope of the present invention.

The effect of incorporating the present invention into a food waste disposer having an encapsulated series-wound motor is graphically represented in FIGURES 3 and 4. As previously mentioned the present invention is particularly adapted for use in a series-wound motor and, as is known in the art, the speed of a series motor varies inversely with the load applied thereto. As seen in FIGURE 3, with the present invention incorporated into the food waste disposer 10, and the disposer being operated under no load conditions, the thermally responsive means 33 de-energizes motor 17 in approximately 60% of the time necessary in the absence of the fan 29 and the flow directing means 30. In FIGURES 3 and 4, line A represents the operational curve of a device having the present invention while line B represents an identical device without the present invention. In contrast, under normal load conditions as illustrated in FIGURE 4, the time at which motor 17 is de-energized is reduced only 20% by the use of the present invention. This is significant since bearing wear is accelerated during high speed operation of the motor even though the total heat generated by the motor during high speed operation is significantly less than that generated during normal load operation due to the decrease in heat generated by electrical resistance. In other words, the present invention compensates for the decreased heat generation in the motor during no load operation of the food waste disposer to prevent excessive bearing wear from extended operation at high speed, no load condition.

As will be evident from the foregoing description, certain aspects of the invention are not limited to the particular details of construction of the example illustrated, and it is contemplated that various other modifications or applications will occur to those skilled in the art. It is therefore intended that the appended claims shall cover such modifications and applications as do not depart from the true spirit and scope of the invention.

What I claim as new and desire to secure by Letters Patent of the United States is:

1. An electric motor comprising:
   (a) a shaft bearing,
   (b) a casing encapsulating the motor,
   (c) a heat transfer chamber adjacent said casing,
   (d) a heat transfer medium within said chamber,
   (e) thermally responsive means within said chamber adapted to de-energize the motor upon sensing a temperature in excess of a predetermined value,
   (f) means to circulate said medium within said chamber, and
   (g) flow directing means within said chamber disposed between said bearing and said thermally responsive means,
   (h) said flow directing means having openings therein to direct said medium into heat exchange relationship with said bearing, said casing and said thermally responsive means.

2. An electric motor comprising:
   (a) a shaft bearing,
   (b) a casing encapsulating the motor,
   (c) a housing supported by said casing,
   (d) a heat transfer medium within said housing,
   (e) thermally responsive means within said housing adapted to de-energize the motor upon sensing a temperature in excess of a predetermined value,
   (f) means to circulate said medium within said housing, and
   (g) flow directing means within said housing disposed between said bearing and said thermally responsive means,
   (h) said flow directing means having openings therein to direct said medium into heat exchange relationship with said bearing, said casing and said thermally responsive means.

3. An electric motor comprising:
   (a) a shaft bearing,
   (b) a casing encapsulating the motor,
   (c) a housing supported by said casing,
   (d) said housing being formed of a material having high heat conductivity,
   (e) a heat transfer medium within said housing, (f) means to circulate said medium within said housing, and
(g) flow directing means within said housing disposed between said bearing and said housing,
(h) said flow directing means having openings therein to direct said medium into heat exchange relationship with said bearing, said casing and the inner surface of said housing.

4. An electric motor comprising:
(a) a shaft bearing,
(b) a casing encapsulating the motor,
(c) a housing supported by said casing,
(d) said housing being formed of a material having high heat conductivity,
(e) a heat transfer medium within said housing,
(f) thermally responsive means within said housing adapted to de-energize the motor upon sensing a temperature in excess of a predetermined value,
(g) means to circulate said medium within said housing, and
(h) flow directing means within said housing disposed between said bearing and said housing,
(i) said flow directing means having openings therein to direct said medium into heat exchange relationship with the inner surface of said housing, said bearing, said casing and said thermally responsive means.

5. A food waste disposer comprising:
(a) comminuting means,
(b) a series-wound electric motor to drive said comminuting means,
(c) a casing encapsulating said motor,
(d) a bearing for the motor shaft,
(e) a housing supported by said casing,
(f) said housing being formed of a material having high heat conductivity,
(g) a heat transfer medium within said housing,
(h) thermally responsive means within said housing adapted to de-energize the motor upon sensing a temperature in excess of a predetermined value,
(i) means to circulate said medium within said housing, and
(j) flow directing means within said housing disposed between said bearing and said housing,
(k) said flow directing means having openings therein to direct said medium into heat exchange relationship with the inner surface of said housing, said bearing, said casing and said thermally responsive means.

6. The invention defined in claim 5 wherein said circulating means is driven by said motor at a speed directly proportional to the speed of said comminuting means.

References Cited by the Examiner
UNITED STATES PATENTS

| | | | |
|---|---|---|---|
| 1,935,455 | 11/1933 | Leland | 310—68 |
| 3,075,105 | 1/1963 | Erickson | 310—57 |
| 3,106,334 | 10/1963 | Fogleman et al. | 310—57 |
| 3,159,354 | 12/1964 | Yartz et al. | 310—43 |
| 3,163,369 | 12/1964 | Hogue | 310—43 |

References Cited by the Applicant
UNITED STATES PATENTS

| | | |
|---|---|---|
| 919,203 | 4/1909 | McCullough. |
| 2,279,214 | 4/1942 | Veniott. |
| 2,682,005 | 6/1954 | Hemphill et al. |
| 2,710,373 | 6/1955 | Crowell. |

ORIS L. RADER, *Primary Examiner.*

MILTON O. HIRSHFIELD, *Examiner.*

L. L. SMITH, *Assistant Examiner.*